(12) United States Patent
Yoshimura et al.

(10) Patent No.: US 9,912,919 B2
(45) Date of Patent: *Mar. 6, 2018

(54) WEARABLE CAMERA SYSTEM AND RECORDING CONTROL METHOD

(71) Applicant: Panasonic Intellectual Property Management Co., Ltd., Osaka (JP)

(72) Inventors: Masami Yoshimura, Fukuoka (JP); Nobuhito Seki, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

This patent is subject to a terminal disclaimer.

(21) Appl. No.: 15/005,748

(22) Filed: Jan. 25, 2016

(65) Prior Publication Data

US 2016/0344983 A1 Nov. 24, 2016

(30) Foreign Application Priority Data

May 18, 2015 (JP) .................................. 2015-101355

(51) Int. Cl.
*H04N 7/18* (2006.01)
*H04N 5/77* (2006.01)
(Continued)

(52) U.S. Cl.
CPC ............. *H04N 7/185* (2013.01); *B60R 11/04* (2013.01); *H04N 5/23206* (2013.01);
(Continued)

(58) Field of Classification Search
CPC ...... B60R 11/04; H04N 5/23206; H04N 5/77; H04N 7/185; H04N 7/188
See application file for complete search history.

(56) References Cited

U.S. PATENT DOCUMENTS

| 8,781,292 B1* | 7/2014 | Ross | ........................ | G11B 27/11 386/223 |
| 2008/0170130 A1* | 7/2008 | Ollila | ................... | H04N 5/2252 348/211.99 |

(Continued)

FOREIGN PATENT DOCUMENTS

JP 2006-148842 A 6/2006

OTHER PUBLICATIONS

POV.1.5 User Manual, 2008 at http://www.vio-pov.com/marketing/files/manuals/POV15_User_Manual.pdf.*
(Continued)

*Primary Examiner* — Mohammed Rahaman
(74) *Attorney, Agent, or Firm* — Seed IP Law Group LLP

(57) ABSTRACT

Communication is performed between a wearable camera and a vehicle-mounted recorder, the wearable camera captures an image of a capturing area, and the vehicle-mounted camera captures an image of the capturing area. The vehicle-mounted recorder records first image data of the capturing area captured by the vehicle-mounted camera according to a recording start request from the wearable camera, and transmits a recording start instruction to the wearable camera simultaneously with the recording. The wearable camera starts the recording of second image data of the capturing area captured by the wearable camera after the recording start instruction is received.

14 Claims, 15 Drawing Sheets

(51) Int. Cl.
*H04N 5/232* (2006.01)
*B60R 11/04* (2006.01)
(52) U.S. Cl.
CPC ............. *H04N 5/77* (2013.01); *H04N 7/181* (2013.01); *H04N 7/188* (2013.01)

(56) References Cited

U.S. PATENT DOCUMENTS

| 2011/0057783 A1* | 3/2011 | Yagi ........................ B60R 1/00 340/436 |
| 2014/0063291 A1* | 3/2014 | Ohshima ................ H04N 5/232 348/231.99 |
| 2015/0086175 A1* | 3/2015 | Lorenzetti ............ H04N 9/8211 386/226 |

OTHER PUBLICATIONS

"Wearable Camera systems", System Assessment, Homeland Security, Mar. 2012 at http://storage.vievu.com/web/documents/Wearable-Camera-Systems_SUM.pdf.*

* cited by examiner

| STATE OF ATTRIBUTE SELECTION SWITCH | ATTRIBUTE INFORMATION |
|---|---|
| C1 | DRIVING UNDER THE INFLUENCE |
| C2 | DRUG ABUSE VIOLATION |
| C3 | STOLEN PROPERTY |

FIG. 12

| IMAGE DATA ID | META-INFORMATION | | | | | | |
|---|---|---|---|---|---|---|---|
| | IMAGE POSITIONAL INFORMATION | Car ID | Officer ID | ATTRIBUTE INFORMATION | RECORDING START TRIGGER | RECORDING START INSTRUCTION TRANSMITTING TIME | OTHER INFORMATION |
| ID1 | 2015/4/28 12:00:01 | Car0010 | User0123 | DRIVING UNDER THE INFLUENCE | VEHICLE-MOUNTED CAMERA SYSTEM INSTRUCTION | 2015/4/28 12:00:00 | ... |
| ID2 | 2015/4/30 14:05:30 | Car0010 | User0123 | DRUG ABUSE VIOLATION | RECORDING SWITCH MANUAL PUSH | / | ... |
| ... | ... | ... | ... | ... | ... | ... | ... |

FIG. 13

| IMAGE DATA ID | META-INFORMATION ||||||
|---|---|---|---|---|---|---|
| | IMAGE POSITIONAL INFORMATION | Car ID | Officer ID | RECORDING START TRIGGER | RECORDING START INSTRUCTION TRANSMITTING TIME | OTHER INFORMATION |
| ID1 | 2015/4/28 12:00:00 | Car0010 | User0123 | VEHICLE-MOUNTED CAMERA SYSTEM INSTRUCTION | 2015/4/28 12:00:00 | ... |
| ID2 | 2015/4/30 14:05:30 | Car0010 | User0123 | RECORDING SWITCH MANUAL PUSH | | ... |
| .. | .. | .. | .. | .. | .. | .. |

WEARABLE CAMERA SYSTEM AND RECORDING CONTROL METHOD

BACKGROUND OF THE INVENTION

1. Field of the Invention

The present invention relates to a wearable camera system and a recording control method using a wearable camera capable of being worn on the clothing or body of a user.

2. Description of the Related Art

In recent years, for example, in order to support the work of a police officer or a security guard, the introduction of a wearable camera used by being worn by the police officer or the security guard has been examined.

As the related art using the wearable camera, for example, there is a wearable monitoring camera system described in Japanese Patent Unexamined Publication No. 2006-148842. The wearable monitoring camera system described in Japanese Patent Unexamined Publication No. 2006-148842 has a configuration in which an image signal and a voice signal from CCD camera means and microphone means which are worn on the body and a date and time information signal from built-in clock means are encoded by encoding server means accommodated in pouch means worn on the body and a captured image can be recorded by superimposing date and time information converted into character information on the captured image.

For example, in the wearable monitoring camera system described in Japanese Patent Unexamined Publication No. 2006-148842, when the police officer or the security guard wears the wearable monitoring camera system and records the image, it is considered that the police officer or the security guard pushes a recording button and thus, the recording of the image data is started.

For example, when it is considered that the configuration disclosed in the patent literature described above is applied to an immediate action of the police officer, there is a problem that it is necessary to record the situation of a wide scene of an incident such that more information to be helpful in inspecting the scene later remains. In order to solve the problem, the police officer merely wearing the wearable monitoring camera system described in Japanese Patent Unexamined Publication No. 2006-148842 is not sufficient to record the situation of the wide scene of the incident. In the patent literature described above, since one wearable monitoring camera system is used by one security guard, when one wearable monitoring camera system is used, there are limitations in recording of the wide scene of the incident.

SUMMARY OF THE INVENTION

In view of such circumstances, the present disclosure provides a wearable camera system and a recording control method which improve the convenience of handling image data captured by a wearable camera or a vehicle-mounted camera, and which record the situation of a wide scene as image data.

The present disclosure provides a wearable camera system that includes a wearable camera capable of being worn by a user, and a vehicle-mounted recorder and a vehicle-mounted camera which are mounted on a vehicle into which the user gets and are connected to each other. The wearable camera includes a first communicator that communicates with the vehicle-mounted recorder, a first capture that captures an image of a capturing area, and a first recorder that records first image data of the capturing area captured by the first capture in a first memory. The vehicle-mounted recorder includes a second communicator that communicates with the wearable camera, and a second recorder that records second image data of the capturing area captured by the vehicle-mounted camera in a second memory. The vehicle-mounted recorder instructs the second recorder to start the recording of the second image data when a recording start request is received, and transmits the recording start instruction to the wearable camera simultaneously with the instruction. The wearable camera starts the recording of the first image data after the recording start instruction is received.

According to the present disclosure, it is possible to improve the convenience of handling image data captured by a wearable camera or a vehicle-mounted camera, and it is possible to record the situation of a wide scene as image data.

BRIEF DESCRIPTION OF DRAWINGS

FIG. 12 is a diagram showing an example of the data structure of a record image list retained in the wearable camera of the present exemplary embodiment;

FIG. 13 is a diagram showing an example of the data structure of the record image list retained in the vehicle-mounted recorder of the present exemplary embodiment;

DETAILED DESCRIPTION OF THE PREFERRED EMBODIMENT

Figure 1:
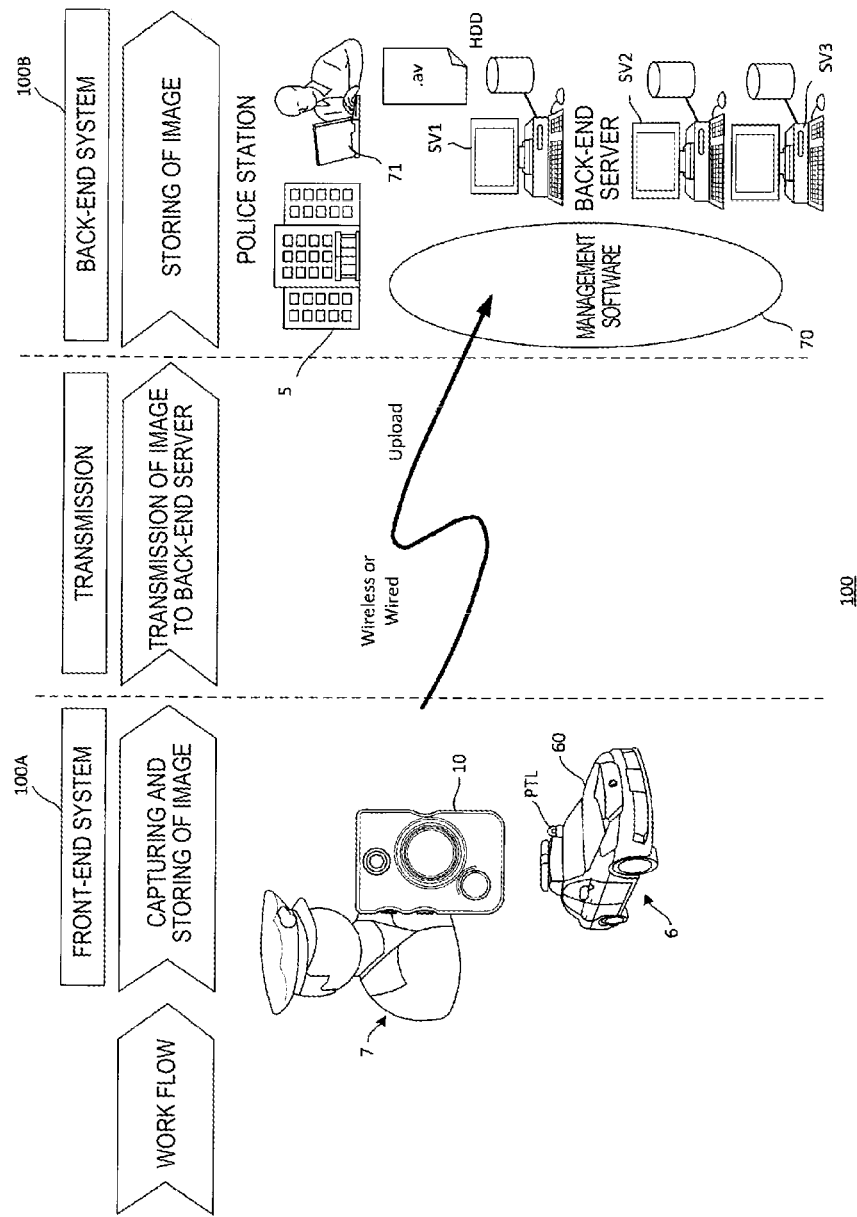
FIG. 1 is an explanatory diagram for describing the outline of a wearable camera system of the present exemplary embodiment and the use of image data captured by a wearable camera.

Hereinafter, an exemplary embodiment (hereinafter, referred to as "present exemplary embodiment") which discloses a wearable camera system and a recording control method according to the present invention will be described in detail by appropriately referring to the drawings. However, unessential detailed description may be omitted. For example, the detailed description of well-known matters or repeated description of substantially the same configuration may be omitted. This is because those skilled in the art can easily understand the present disclosure without the following description being unnecessarily redundant. The accompanying drawings and the following description are provided to allow those skilled in the art to sufficiently understand the present disclosure, and the subject matters defined in the claims are not intended to be limited by the accompanying drawings and the following description.

Figure 2:
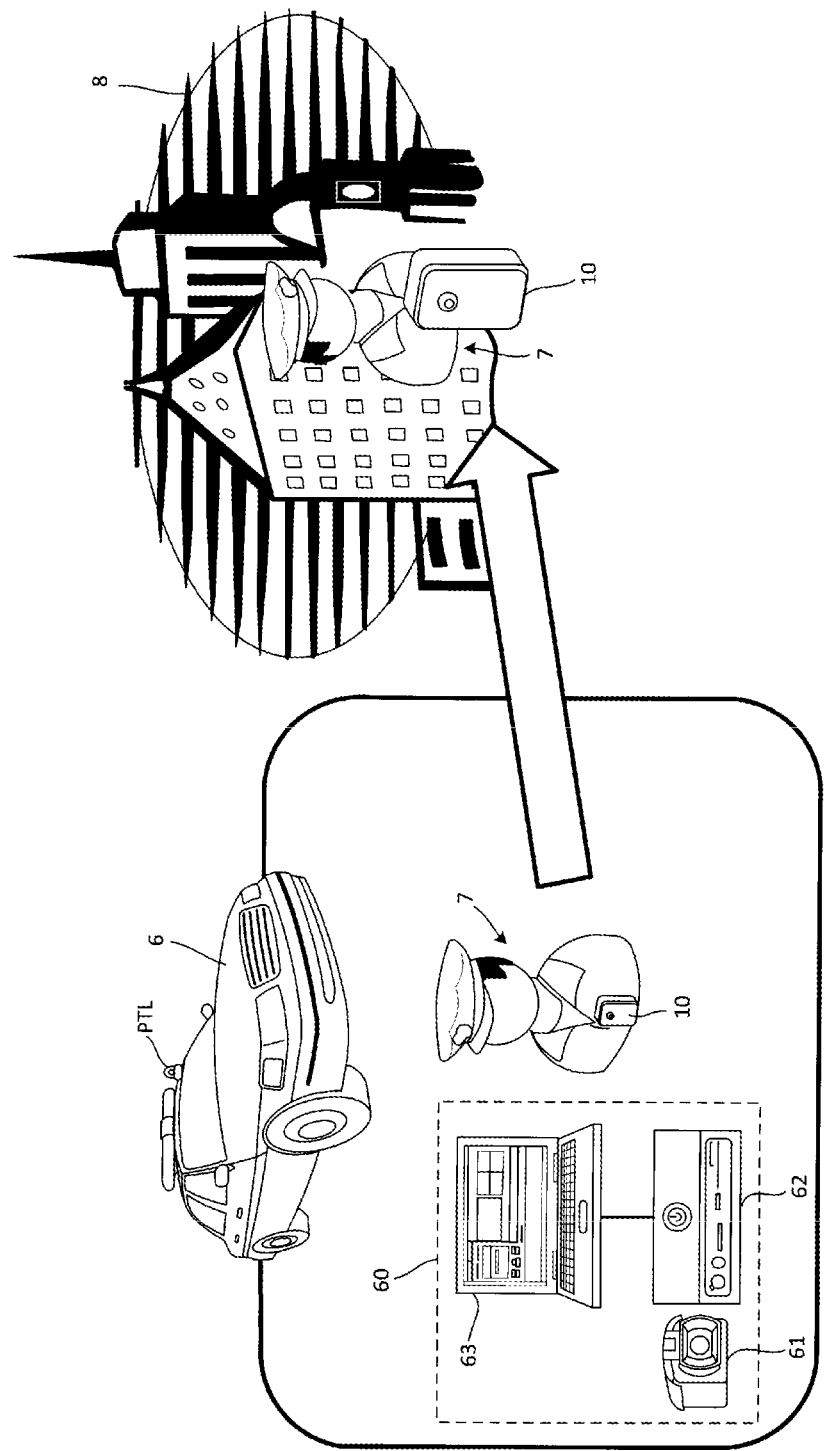
FIG. 2 is a schematic diagram showing an image of which a police officer who wears the wearable camera of the present exemplary embodiment gets into a police car and heads for a scene.

FIG. 1 is an explanatory diagram for describing the outline of wearable camera system 100 of the present exemplary embodiment and the use of image data captured by wearable camera 10. FIG. 2 is a schematic diagram showing an image of which police officer 7 who wears wearable camera 10 of the present exemplary embodiment gets into police car 6 and heads for scene 8.

Wearable camera 10 of the present exemplary embodiment is a capturing device capable of being worn on the body or clothing of a user (for example, police officer 7 or a security guard). Wearable camera 10 has a communication function of performing communication with vehicle-mounted camera system 60 mounted on a vehicle (for example, a vehicle such as a police car used to patrol or guard) into which the user gets and servers SV1, SV2 and SV3 within back-end system 100B within a user organization.

In wearable camera system 100, wearable camera 10 and vehicle-mounted camera system 60 constitute front-end system 100A, and management software 70 on a network, station PC 71 which is a PC within police station 5, and servers SV1, SV2 and SV3 constitute back-end system 100B. For example, management software 70 is executed by station PC 71 or servers SV1 to SV3.

An example in which wearable camera system 100 of the present exemplary embodiment is used in police station 5 will be described. In this case, police officer 7 captures an image by using wearable camera 10, and for example, the captured image data is transmitted to and is accumulated in back-end system 100B within police station 5. Wearable camera 10 is not limited to the example in which the user is police officer 7, and may be used in various offices (for example, a security company). In the present exemplary embodiment, an example in which the user is police officer 7 will be mainly described.

Front-end system 100A includes wearable camera 10 capable of being worn by police officer 7 who is dispatched as a first responder to scene 8 related to an incident or patrolling, and vehicle-mounted camera system 60 mounted within police car 6. Vehicle-mounted camera system 60 includes vehicle-mounted camera 61, vehicle-mounted recorder 62, vehicle-mounted management PC 63, and a communication unit and the like, and constitute an image management system (see FIG. 2).

Vehicle-mounted camera 61 is provided in a predetermined position within police car 6 to which PATLITE (registered trademark) PTL is attached, and includes a capture (not shown) which captures an image of the area surrounding police car 6 at all times or at a predetermined timing. For example, vehicle-mounted camera 61 includes a front camera (not shown) for capturing the front side of police car 6, and a backseat camera (not shown) for capturing a backseat (for example, a seat on which a suspect sits) within police car 6. For example, the image data captured by vehicle-mounted camera 61 is accumulated in a memory (for example, SSD 111 to be described below) of vehicle-mounted recorder 62 when a recording operation is performed. Vehicle-mounted camera 61 may be plural in number. A microphone (not shown) which collects sound inside and outside police car 6 may be provided at the front camera or the backseat camera. In this case, voice generated by police officer 7 or the suspect within police car 6 may also be collected (recorded).

Vehicle-mounted recorder 62 accumulates the image data captured by vehicle-mounted camera 61. Vehicle-mounted recorder 62 may manage the image data captured by vehicle-mounted camera 61 by attaching meta-information such as attribute information to the image data. Vehicle-mounted recorder 62 may acquire and accumulate the image data captured by wearable camera 10. The meta-information such as attribute information may be attached to the acquired image data or the accumulated image data.

Vehicle-mounted management PC 63 may be a PC fixedly mounted within police car 6, or may be a wireless communication device such as a PC, a smartphone, a mobile phone, a tablet terminal or a personal digital assistant (PDA) which can be also carried, outside police car 6. Vehicle-mounted management PC 63 allows for the cooperation between vehicle-mounted camera system 60 and wearable camera 10 by executing management software that is not shown. A user interface (UI) (for example, an operator, a display, or a sound output) of vehicle-mounted management PC 63 is used as a UI for operating vehicle-mounted recorder 62. Vehicle-mounted management PC 63 may control the turn-on or turn-off of PATLITE (registered trademark) PTL in response to an input operation of police officer 7.

For example, when police officer 7 is dispatched from police station 5 for regular duty (for example, patrolling), the police officer wears wearable camera 10, gets into police car 6 equipped with vehicle-mounted camera system 60, and heads for scene 8 (see FIG. 2).

For example, in front-end system 100A, an image of scene 8 to be patrolled is captured by vehicle-mounted camera 61 of vehicle-mounted camera system 60 mounted on police car 6, police officer 7 gets out of police car 6, and captures an image of scene 8 (that is, image data of scene 8 having an angle different from the angle of view of the image data captured by vehicle-mounted camera 61, as an angle of view) by using wearable camera 10. For example, image data of a moving image or a still image captured by wearable camera 10 is stored in the memory of vehicle-mounted recorder 62 or vehicle-mounted management PC 63 of vehicle-mounted camera system 60 or the memory of wearable camera 10.

Wearable camera 10 transmits (uploads) various data items including the image data captured by wearable camera 10 to back-end system 100B from the memory of wearable camera 10. Vehicle-mounted camera system 60 (for example, vehicle-mounted recorder 62) transmits (uploads)

various data items including the image data captured by vehicle-mounted camera 61 to back-end system 100B from the memory of vehicle-mounted camera system 60.

For example, the transmission of the data to back-end system 100B is performed from scene 8 through connection of wireless communication, or is performed through wired communication, wireless communication or manual connection (for example, carrying of a storage medium) when the police officer returns to police station 5 after the patrolling is ended. Back-end system 100B includes servers SV1 to SV3 provided within police station 5 or in another place, management software 70 for communicating with front-end system 100A and station PC 71.

Servers SV1 to SV3 include storages such as a hard disk drive (HDD), or a solid state drive (SSD) inside or outside servers SV1 to SV3. Servers SV1 to SV3 store the image data transmitted from front-end system 100A and other data in servers SV1 to SV3. For example, servers SV1 to SV3 receive the image data transmitted from wearable camera 10 or vehicle-mounted camera system 60 (for example, vehicle-mounted recorder 62), and store in the storage such as an HDD.

For example, the image data stored in back-end system 100B is used in the operation and inspection conducted by a person in charge in relevant departments within police station 5, and when necessary, the image data is copied in a predetermined storage medium (for example, digital versatile disk (DVD)), and is presented as evidence in a predetermined scene (for example, a trial). In the present exemplary embodiment, it is possible to more accurately acquire and store image evidence of scene 8 by using wearable camera 10 provided to police officer 7.

When police officer 7 is dispatched to scene 8 from police station 5 and uses wearable camera 10, identification information (for example, officer ID) of police officer 7, identification information (for example, camera ID) of wearable camera 10 used by the police officer, and identification information (for example, car ID) of police car 6 used by police officer 7 are set and registered using station PC 71. Thus, it is possible to accurately distinguish a date when the image data accumulated in servers SV1 to SV3 is captured and a police officer or a camera that captures the image data.

For example, the setting and registering of police officer 7 or wearable camera 10 are performed through the operation of the operator (not shown) of station PC 71 by police officer 7 who is dispatched or a person in charge within police station 5 and execution of management software 70 by station PC 71. In the setting and registering, information other than the officer ID, the camera ID and the car ID may be input through the operator of station PC 71.

That is, for example, management software 70 includes an application for managing the number of police officers 7, an application for managing the allocation of police cars 6, and an application for managing the carrying-out of wearable camera 10. Management software 70 includes an application for searching for and extracting specific image data from a plurality of image data items stored in servers SV1 to SV3 based on attribute information.

When police officer 7 gets on police car 6, police officer 7 can log on to vehicle-mounted camera system 60. For example, at the time of the log-on, the officer ID, the camera ID and other information are input by operating the operator of vehicle-mounted management PC 63, similarly to the setting and registering within police station 5. For example, the input officer ID, the camera ID and the other information are stored in vehicle-mounted recorder 62.

When police officer 7 logs on vehicle-mounted camera system 60, police officer 7 is permitted to use vehicle-mounted camera system 60. The cooperation between vehicle-mounted camera system 60 and wearable camera 10 possessed by police officer 7 may be possible after the log-on. For example, police officer 7 can check the image data captured by wearable camera 10 through vehicle-mounted management PC 63 by transmitting the image data to vehicle-mounted camera system 60 (for example, vehicle-mounted recorder 62), and vehicle-mounted camera system 60 (for example, vehicle-mounted recorder 62) can instruct wearable camera 10 to perform various settings.

Figure 3:
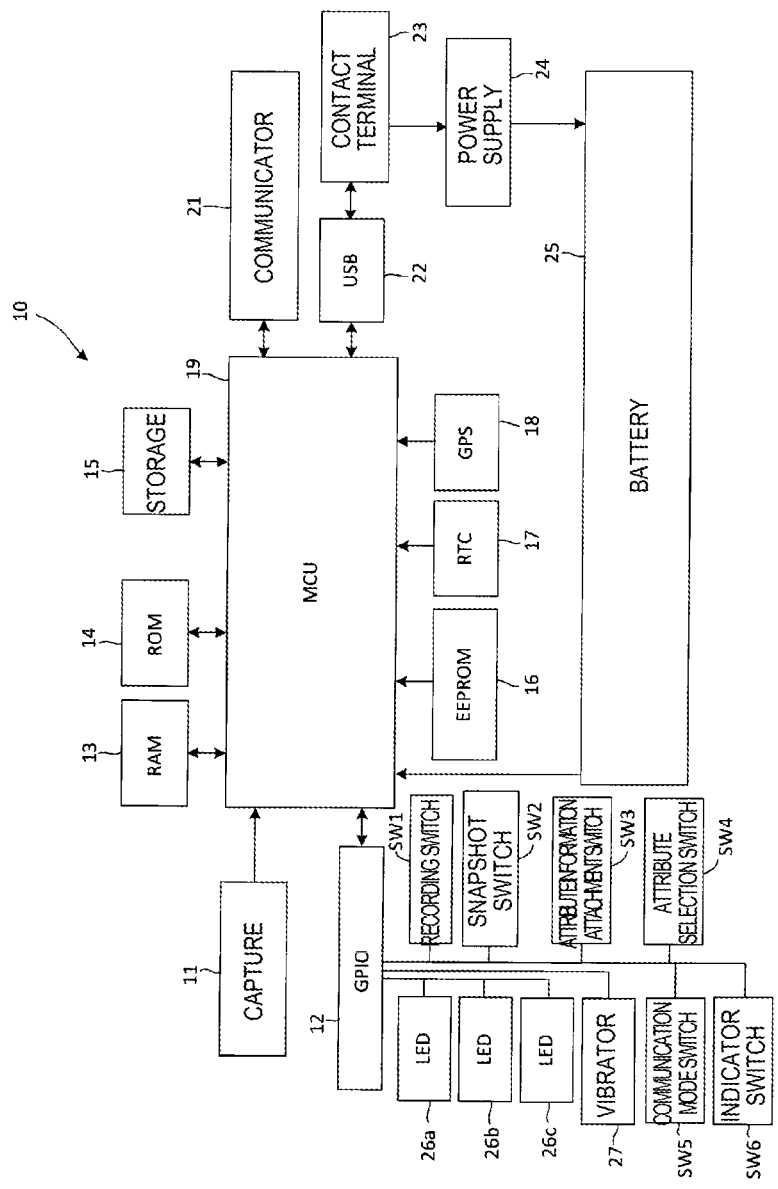
FIG. 3 is a block diagram showing an example of the internal configuration of the wearable camera of the present exemplary embodiment.
Figure 4:
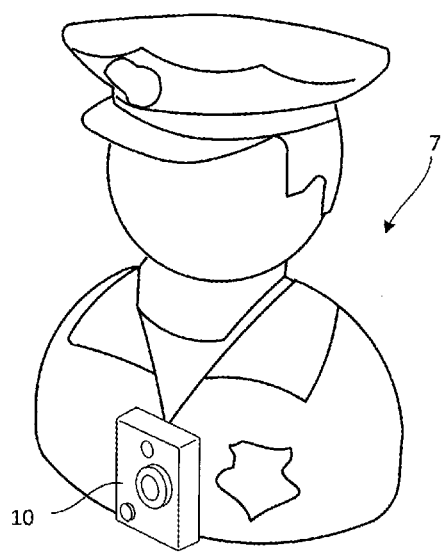
FIG. 4 is a diagram showing an example of a state in which the police officer wears the wearable camera of the present exemplary embodiment.
Figure 5:
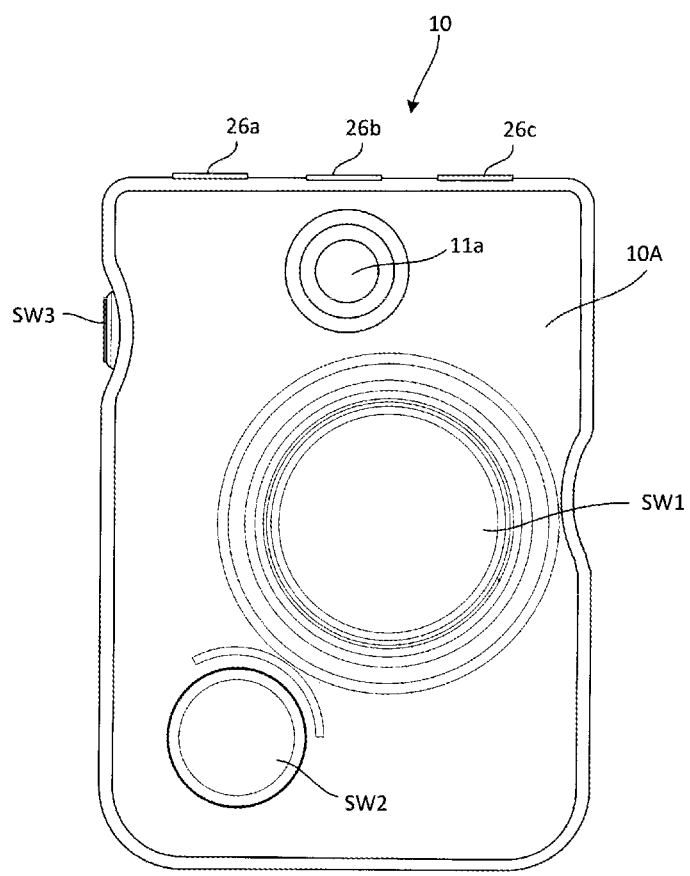
FIG. 5 is a front view showing an example of the outward appearance of the wearable camera of the present exemplary embodiment.
Figure 6:
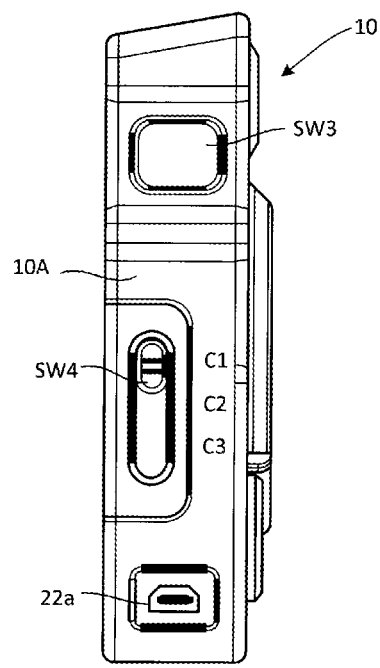
FIG. 6 is a left-side view showing an example of the outward appearance of the wearable camera of the present exemplary embodiment.
Figure 7:
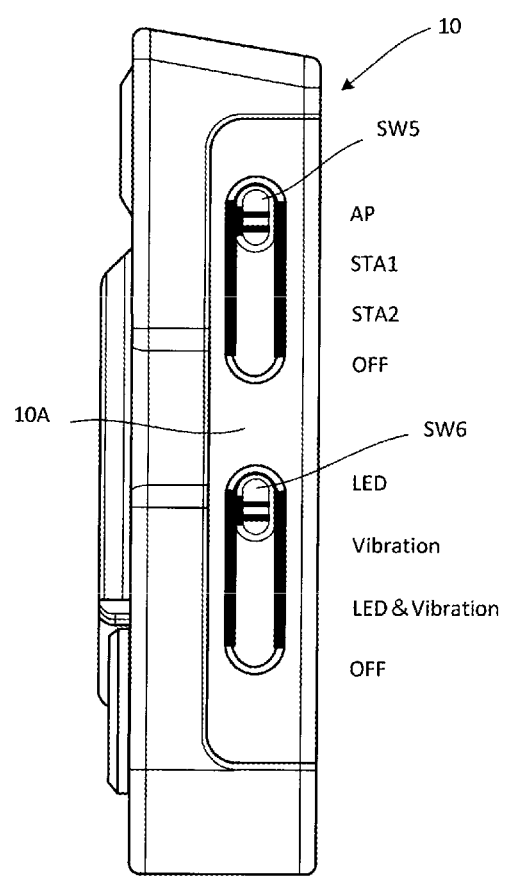
FIG. 7 is a right-side view showing an example of the outward appearance of the wearable camera of the present exemplary embodiment.

FIG. 3 is a block diagram showing an example of the internal configuration of wearable camera 10 of the present exemplary embodiment. FIG. 4 is a schematic diagram showing a state in which police officer 7 wears wearable camera 10 of the present exemplary embodiment. FIG. 5 is a front view showing an example of the outward appearance of wearable camera 10 of the present exemplary embodiment. FIG. 6 is a left-side view showing an example of the outward appearance of wearable camera 10 of the present exemplary embodiment. FIG. 7 is a right-side view showing an example of the outward appearance of wearable camera 10 of the present exemplary embodiment.

As shown in FIG. 3, wearable camera 10 includes capture 11, general-purpose input/output (GPIO) 12, random access memory (RAM) 13, read only memory (ROM) 14, and storage 15. Wearable camera 10 includes electrically erasable programmable ROM (EEPROM) 16, real time clock (RTC) 17, and global positioning system (GPS) 18. Wearable camera 10 includes micro controller unit (MCU) 19, communicator 21, universal serial bus (USB) 22, contact terminal 23, power supply 24, and battery 25.

Wearable camera 10 includes recording switch SW1, snapshot switch SW2, attribute information attachment switch SW3, attribute selection switch SW4, communication mode switch SW5, and indicator switch SW6 which are examples of an operation input. Wearable camera 10 includes light-emitting diodes (LEDs) 26a, 26b and 26c, and vibrator 27 which are examples of a state display.

For example, capture 11 includes capturing lens 11a (see FIG. 5), and a solid-state capturing device such as a charge-coupled device (CCD) type image sensor or a complementary metal oxide semiconductor (CMOS) type image sensor. Capture 11 outputs image data of a subject obtained through the capturing to MCU 19.

GPIO 12 is a parallel interface, and inputs and outputs a signal between recording switch SW1, snapshot switch SW2, attribute information attachment switch SW3, attribute selection switch SW4, communication mode switch SW5, indicator switch SW6, LEDs 26a to 26c and vibrator 27, and MCU 19. For example, various sensors (for example, acceleration sensor) are connected to GPIO 12.

For example, RAM 13 is a work memory used in the operation of MCU 19. For example, ROM 14 is a memory which previously stores data and programs for controlling MCU 19.

For example, storage 15 is constituted by a storage medium such as an SD memory, and stores the image data obtained through the capturing of capture 11. When the SD memory is used as storage 15, the storage may be attached to and detached from a case main body of wearable camera 10.

For example, EEPROM 16 stores identification information (for example, camera ID which is a serial number) for identifying wearable camera 10 and other setting information. For example, the other setting information includes log-on information (for example, car ID or officer ID) obtained through the setting and registering in station PC 71 or the logging in vehicle-mounted recorder 62, and correspondence information indicating the correspondence between state and attribute information of attribute selection switch SW4.

RTC 17 counts current time information, and outputs the counted information to MCU 19.

GPS 18 receives current positional information and time information of wearable camera 10 from a GPS transmitter (not shown), and outputs the received information to MCU 19. The time information is used to correct a system time of the wearable camera.

For example, MCU 19 has a function of a controller, and is operated according to the data and programs stored in ROM 14 by performing a control process for controlling the entire operation of the respective components of wearable camera 10, an input and output process of data to and from other components of wearable camera 10, a data operation (calculation) process, and a data storing process. For example, at the time of operation, MCU 19 acquires the current time information by RTC 17, and acquires the current positional information by GPS 18 by using RAM 13. For example, MCU 19 as an example of a first recorder records the image data captured by capture 11 in storage 15.

For example, communicator 21 regulates the connection between communicator 21 and MCU 19 in a physical layer which is a first layer of open systems interconnection (OSI) reference model. For example, communicator 21 performs wireless communication (for example, Wifi (registered trademark)) through wireless LAN (W-LAN) according to the regulation. Communicator 21 may perform wireless communication such as near field communication (NFC), or Bluetooth (registered trademark).

For example, USB 22 is a serial bus, and allows for the connection with vehicle-mounted camera system 60 or station PC 71 within police station 5.

Contact terminal 23 is a terminal that is electrically connected with a cradle (not shown) or an external adaptor (not shown), is connected to MCU 19 through USB 22, and is connected to power supply 24. Wearable camera 10 can be charged or can perform communication of data including image data through contact terminal 23.

For example, a "charging terminal V+", a "CON.DET terminal", "data terminals D− and D+", and a "ground terminal" (all not shown) are provided in contact terminal 23. The CON.DET terminal is a terminal for detecting a voltage and a voltage change. For example, the data terminals D− and D+ are terminals for transmitting the image data captured by wearable camera 10 to an external PC through a USB connector terminal.

It is possible to perform data communication between wearable camera 10 and the external device by connecting contact terminal 23 to the connector of the cradle (not shown) or the external adaptor (not shown).

For example, power supply 24 supplies a power-supply power supplied to battery 25 from the cradle or the external adaptor through contact terminal 23, and charges battery 25. For example, battery 25 is a secondary battery capable of being charged, and supplies a power-supply power to the respective components of wearable camera 10.

Figure 14:
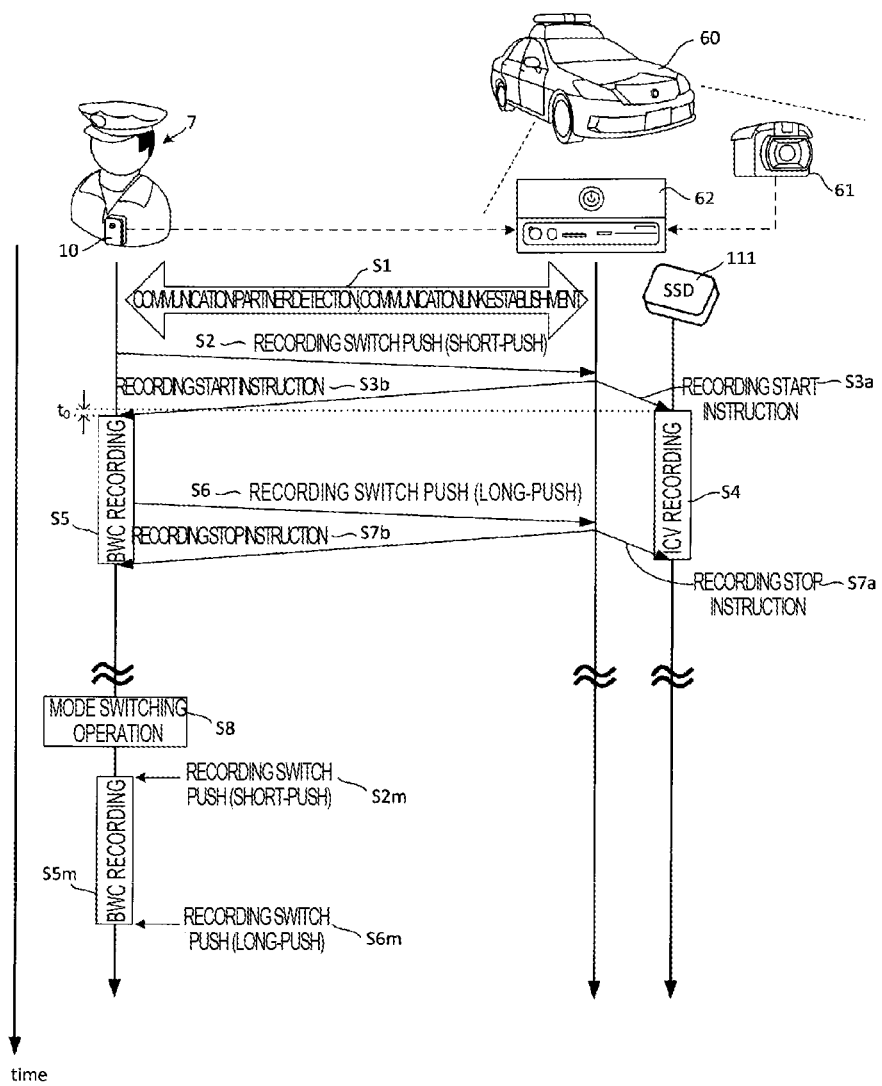
FIG. 14 is a sequence diagram for describing a first example of a procedure of a recording start and recording stop operation in the wearable camera system according to the present exemplary embodiment in detail.

For example, recording switch SW1 is a push button switch which inputs operation instructions to start and stop the recording (capturing of moving image) through a push operation of police officer 7. Recording switch SW1 outputs the instruction for starting the recording of the image data captured by capture 11 to MCU 19 when police officer 7 performs a short-push operation (for example, pushing the switch once for a time of about less than 1 second). Thus, wearable camera 10 starts the recording of the image data. Alternatively, as shown in FIG. 14 to be described below, wearable camera 10 may transmit a request to start the recording of the image data to vehicle-mounted recorder 62 without immediately starting the recording of the image data through the short-push operation of recording switch SW1. For example, it is preferable that whether or not to immediately start the recording of the image data or whether or not to transmit the instruction to start the recording of the image data to vehicle-mounted recorder 62 is controlled such that the former process is performed or the latter process is performed, by logically switching an operation mode of recording switch SW1 through the short-push operation of recording switch SW1.

For example, when police officer 7 performs a long-push operation (for example, pushing the switch once for a time of about 3 seconds), recording switch SW1 outputs an instruction to stop the recording of the image data captured by capture 11 to MCU 19. Thus, wearable camera 10 stops the recording of the image data. Alternatively, as shown in FIG. 14 to be described below, wearable camera 10 may transmit the request to stop the recording of the image data to vehicle-mounted recorder 62 without immediately stopping the recording of the image data through the long-push operation of recording switch SW1. For example, it is preferable that whether or not to immediately stop the recording of the image data or whether or not to transmit the instruction to stop the recording of the image data to vehicle-mounted recorder 62 is controlled such that the former process is performed or the latter process is performed by logically switching an operation mode of recording switch SW1 through the long-push operation of recording switch SW1.

For example, snapshot switch SW2 is a push button switch which inputs an operation instruction to capture the still image through a push operation of police officer 7.

For example, attribute information attachment switch SW3 is a push button switch which inputs an operation instruction to attach attribute information to the image data through a push operation of police officer 7.

For example, attribute selection switch SW4 is a sliding switch which inputs an operation instruction to select an attribute to the image data.

For example, communication mode switch SW5 is a sliding switch which inputs an operation instruction to set a communication mode between wearable camera 10 and the external device.

For example, indicator switch SW6 is a sliding switch which inputs an operation instruction to set an operation state display mode due to LEDs 26a to 26c and vibrator 27.

Recording switch SW1, snapshot switch SW2, attribute information attachment switch SW3 and attribute selection switch SW4 can be easily operated, even in an emergency. The respective switches are not limited to the above-described example, and may be another type of operation input device capable of inputting the operation instruction of the user.

For example, LED 26a is a display that displays a state of battery 25 and a power supply state (turn-on and turn-off state) of wearable camera 10. For example, LED 26b is a display that displays a state (recording state) of the capturing operation of wearable camera 10. For example, LED 26c is a display that displays a state of the communication mode of wearable camera 10.

MCU 19 detects a switch input of recording switch SW1, snapshot switch SW2, attribute information attachment switch SW3, attribute selection switch SW4, communication mode switch SW5 or indicator switch SW6, and processes the operated switch input.

When the operation input of recording switch SW1 is detected, MCU 19 controls the starting or stopping of the capturing operation of capture 11, and stores the image data acquired from capture 11 in storage 15, as the image data of the moving image. The details of the operation will be described with reference to FIGS. 14 and 15.

When the operation input of snapshot switch SW2 is detected, MCU 19 stores the image data captured by capture 11 when snapshot switch SW2 is operated in storage 15, as the image data of the still image. When the operation input of attribute information attachment switch SW3 is detected, MCU 19 attaches preset attribute information to the image data, and retains the attribute information in association with the image data in storage 15. In this case, correlation information indicating the correlation between a state of attribute selection switch SW4 and predetermined attribute information is retained in EEPROM 16, and MCU 19 detects the state of attribute selection switch SW4, and attaches the attribute information corresponding to the setting of attribute selection switch SW4 to the detected state.

MCU 19 detects a state of communication mode switch SW5, and operates communicator 21 according to the communication mode corresponding to the setting of communication mode switch SW5. When the recording operation is started, MCU 19 detects a state of indicator switch SW6, and notifies the outside of the state of the recording operation by LED display and/or vibrator vibration depending on the setting of indicator switch SW6.

As shown in FIG. 4, for example, wearable camera 10 is used by being worn on the clothing or body of police officer 7 such as the chest of police officer 7 such that an image within a field of view from a position close to a visual field of police officer 7 is captured. Thus, wearable camera 10 may be referred to as a body worn camera (BWC) (see FIGS. 14 and 15). Police officer 7 operates recording switch SW1, and captures a surrounding subject while wearing wearable camera 10.

As shown in FIG. 5, capturing lens 11a of capture 11, recording switch SW1 and snapshot switch SW2 are provided on a front surface of case 10A having a substantially rectangular parallelepiped shape in wearable camera 10. For example, the recording (capturing of the moving image) is started through the short-push operation of recording switch SW1, and the recording is ended through the long-push operation of the recording switch. For example, the recording of the still image at the moment of being captured by capture 11 is performed by MCU 19 whenever snapshot switch SW2 is pushed.

As shown in FIG. 6, attribute information attachment switch SW3, attribute selection switch SW4, and USB connector 22a are provided on a left-side surface when viewed from a front surface of case 10A of wearable camera 10. Police officer 7 pushes attribute information attachment switch SW3, and thus, the attribute information corresponding to the setting state of attribute selection switch SW4 is attached to the image data that is being currently recorded or immediately-before recorded image data.

Attribute selection switch SW4 is a sliding switch having three-step contact points of C1, C2 and C3 in the illustrated example, and police officer 7 selects and designates attribute information items which are set so as to be respectively allocated to C1 to C3.

A cable that is connected to an external device through USB 22 is connected to USB connector 22a. Thus, data communication can be performed by connecting wearable camera 10 to vehicle-mounted camera system 60 or station PC 71 within police station 5.

As shown in FIG. 7, communication mode switch SW5 and indicator switch SW6 are provided on a right-side surface when viewed from the front surface of case 10A of wearable camera 10.

Communication mode switch SW5 is a sliding switch having four-step contact points of AP, STA1, STA2 and OFF in the illustrated example, and the user selects and designates the communication mode of wearable camera 10. AP is an access point mode, and is a mode for allowing wearable camera 10 to operate as an access point of a wireless LAN. For example, wearable camera 10 is wirelessly connected to a mobile terminal (not shown) possessed by police officer 7 in AP, and communicates with the mobile terminal. In the access point mode, the mobile terminal is connected to wearable camera 10, and thus, it is possible to display a current live image captured by wearable camera 10, reproduce the recorded image data, display the captured still image, and display the meta-information or attribute information attached to the image data.

STA1 and STA2 are station modes, and are modes for performing communication using the external device as an access point when the wearable camera is connected to the external device using a wireless LAN. STA1 is a mode for allowing the wearable camera to be connected to an access point within police station 5, and STA2 is a mode for allowing the wearable camera to be connected to vehicle-mounted camera system 60. Different connection destination information items are respectively set to these modes.

In the station mode, wearable camera 10 can perform various settings and transmit (uploads) the recorded image data retained in wearable camera 10 to vehicle-mounted camera system 60, or servers SV1 to SV3 or station PC 71 within police station 5. OFF is a mode in which the wireless LAN is in a non-use state by turning off a communication operation of a wireless LAN.

Indicator switch SW6 is a sliding switch having four-step contact points of LED, Vibration, LED & Vibration, and OFF in the illustrated example, and police officer 7 selects and designates a notification mode of wearable camera 10. LED is a mode for displaying the operation state such as a state in which wearable camera 10 is recording the image, using LEDs 26a to 26c. Vibration is a mode for notifying of the operation state of wearable camera 10 by the vibration of vibrator 27. LED & Vibration are modes for notifying of the operation state of wearable camera 10 by the vibration of vibrator 27 and the display of LEDs 26a to 26c. OFF is a mode for turning off the notification operation of the operation state.

As shown in FIG. 4, LEDs 26a to 26c are arranged on a top surface when viewed from the front surface of case 10A of wearable camera 10. Thus, it is possible to visually perceive LEDs 26a to 26c with ease while police officer 7 wears wearable camera 10. LEDs 26a to 26c may be arranged such that it is difficult for a person other than police officer 7 to visually perceive these LEDs. Although not shown, contact terminal 23 is provided on a bottom surface when viewed from the front surface of case 10A of wearable camera 10.

Figure 8:
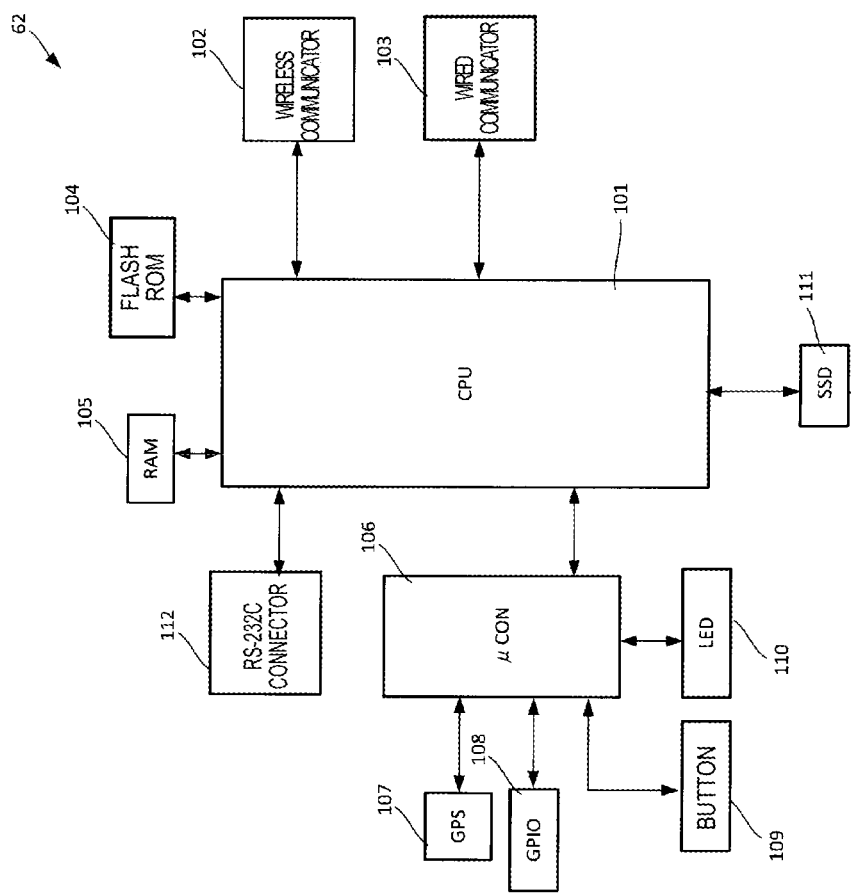
FIG. 8 is a block diagram showing an example of the internal configuration of a vehicle-mounted recorder of the present exemplary embodiment.

FIG. 8 is a block diagram showing an example of the internal configuration of vehicle-mounted recorder 62. Vehicle-mounted recorder 62 includes CPU 101, wireless communicator 102, wired communicator 103, flash ROM 104, RAM 105, μCON 106, GPS 107, GPIO 108, button 109, LED 110, and SSD 111.

For example, CPU 101 performs a control process for controlling the entire operation of the respective components of vehicle-mounted recorder 62, an input and output process of data to and from other components, a data operation (calculation) process, and a data storing process. For example, CPU 101 as an example of a second recorder records the image data captured by vehicle-mounted camera 61 in SSD 111.

Wireless communicator 102 performs wireless communication with the external device through a wireless line. For example, the wireless communication includes wireless local area network (LAN) communication, near field communication (NFC), and Bluetooth (registered trademark). For example, in the wireless LAN communication, communication is performed using an IEEE 802.11n standard of Wifi (registered trademark). For example, CPU 101 and wireless communicator 102 are connected through peripheral component interconnect (PCI) or USB. For example, wireless communicator 102 performs wireless communication with vehicle-mounted camera 61, vehicle-mounted management PC 63, wearable camera 10, and station PC 71 or servers SV1 to SV3 of police station 5.

Wired communicator 103 performs wired communication with the external device through a wired line (for example, wired LAN). For example, wired communicator 103 performs wired communication with vehicle-mounted camera 61, vehicle-mounted management PC 63, wearable camera 10, and station PC 71 or servers SV1 to SV3 of police station 5.

For example, flash ROM 104 is a memory that stores data and programs for controlling CPU 101. Various setting information items are retained.

For example, RAM 105 is a work memory used in the operation of CPU 101. For example, RAM 105 is plural in number.

For example, μCON 106 is a kind of microcomputer, is connected to the respective components (for example, GPS 107, GPIO 108, button 109, and LED 110) related to an external interface, and performs control related to the external interface. For example, μCON 106 is connected to CPU 101 via a universal asynchronous receiver transmitter (UART).

For example, GPS 107 receives current positional information and time information of vehicle-mounted recorder 62 from a GPS transmitter (not shown), and outputs the received information to CPU 101. The time information is used to correct a system time of vehicle-mounted recorder 62.

For example, GPIO 108 is a parallel interface, and inputs and outputs a signal between MCU 19 and the external device (not shown) connected via GPIO 108. For example, various sensors (for example, a speed sensor, an acceleration sensor, and a door opening and closing sensor) are connected to GPIO 108.

For example, button 109 includes a recording button for starting or stopping the recording of the image data captured by vehicle-mounted camera 61, and an attachment button for attaching the meta-information and attribute information to the image data captured by vehicle-mounted camera 61.

For example, LED 110 displays the power supply state (turn-on and turn-off state) of vehicle-mounted recorder 62, the execution state of the recording, the connection state of vehicle-mounted recorder 62 to the LAN, and the use state of the LAN connected to vehicle-mounted recorder 62 by turning on, turning off or blinking the LED.

For example, SSD 111 stores the image data which is captured and is recorded by vehicle-mounted camera 61. SSD 111 may store the image data which is captured and is recorded by wearable camera 10. SSD 111 may store data other than the image data. SSD 111 is connected to CPU 101 through serial ATA (SATA). SSD 111 may be plural in number. A storage (for example, HDD) other than SSD 111 may be provided.

Figure 9:
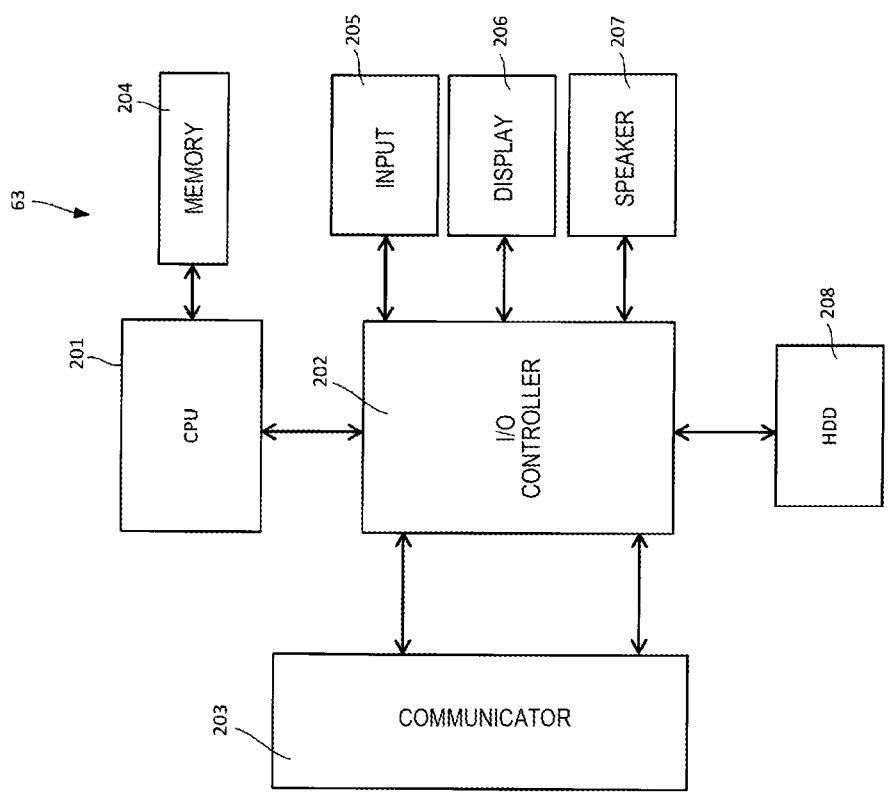
FIG. 9 is a block diagram showing an example of the internal configuration of a vehicle-mounted management PC of the present exemplary embodiment.

FIG. 9 is a block diagram showing an example of the internal configuration of vehicle-mounted management PC 63 of the present exemplary embodiment. Vehicle-mounted management PC 63 includes CPU 201, input/output (I/O) controller 202, communicator 203, memory 204, input 205, display 206, speaker 207, and HDD 208. Vehicle-mounted management PC 63 can communicate with wearable camera 10 and vehicle-mounted recorder 62, and can communicate with station PC 71 or servers SV1 to SV3 of back-end system 100B.

For example, CPU 201 performs a control process for controlling the entire operation of the respective components of vehicle-mounted management PC 63, an input and output process of data to and from other components via I/O controller 202, a data operation (calculation) process, and a data storing process.

For example, CPU 201 authenticates whether or not police officer 7 can log on to vehicle-mounted camera system 60 by the input operation of police officer 7 on a log-on screen (not shown) for vehicle-mounted camera system 60 displayed on display 206. For example, the input operation of police officer 7 is an operation for inputting officer ID and password. For example, various information items related to police officer 7 as a target to be permitted to log on are retained in advance in memory 204, and CPU 201 determines whether or not police officer 7 can log on to vehicle-mounted camera system 60 by using the information of the target to be permitted to log on which is previously stored in memory 204. The log-on may performed by logging on vehicle-mounted camera system 60 via vehicle-mounted management PC 63, or may be performed by logging on an application for operating vehicle-mounted camera system 60 mounted on vehicle-mounted management PC 63.

I/O controller 202 performs control related to the input and output of data between CPU 201 and the respective components (for example, communicator 203, input 205, display 206 and speaker 207) of vehicle-mounted management PC 63, and relays data from CPU 201 and data to CPU 201. I/O controller 202 and CPU 201 may be integrally provided.

For example, communicator 203 performs wired or wireless communication with vehicle-mounted recorder 62, wearable camera 10 capable of being worn by police officer 7, or back-end system 100B.

Only when police officer 7 is logging on vehicle-mounted camera system 60, communicator 203 transmits log-on information stored in memory 204 to wearable camera 10, and the transmitted information is copied.

For example, the log-on formation includes officer ID for identifying police officer 7, camera ID for identifying wearable camera 10, and car ID for identifying police car 6 to use.

For example, memory 204 is constituted by a RAM, a ROM, a nonvolatile or a volatile semiconductor memory, functions as a work memory at the time of operating CPU 201, and stores a predetermined program and data for operating CPU 201. For example, memory 204 stores the log-on information related to police officer 7 permitted to log on to vehicle-mounted camera system 60.

For example, input 205 is a UI which receives the input operation of police officer 7 to notify CPU 201 of the input operation via I/O controller 202, and is a pointing device such as a mouse, or keyboard. For example, input 205 may be arranged so as to correspond to the screen of display 206, and may be a touch panel or a touchpad capable of performing the operation by the finger of police officer 7 or a stylus pen.

For example, input 205 inputs the log-on information for logging in vehicle-mounted camera system 60.

For example, display 206 is constituted by a liquid crystal display (LCD) or an organic electroluminescence (EL), and displays various information items. When the image data captured (recorded) by wearable camera 10 is input in response to the input operation of police officer 7, display 206 displays an image included in the image data on the screen according to an instruction of CPU 201.

When the image data including voice captured (recorded) by wearable camera 10 is input in response to the input operation of police officer 7, speaker 207 outputs the voice included in the image data according to an instruction of CPU 201. Display 206 and speaker 207 may have a configuration different from that of vehicle-mounted management PC 63.

For example, HDD 208 stores various data items, and software (software program). Specifically, for example, HDD 208 stores software for controlling or setting vehicle-mounted recorder 62 and software for controlling and setting wearable camera 10. For example, HDD 208 is transmitted from wearable camera 10, and stores the image data captured by wearable camera 10.

Hereinafter, the attachment of the attribute information to the image data will be described.

In wearable camera system 100, a case where the image data which is recorded by wearable camera 10 and is transmitted to and stored in servers SV1 to SV3 is used is assumed. Similarly, a case where the image data which is captured by vehicle-mounted camera 61, is recorded by vehicle-mounted recorder 62, and is transmitted to and stored in servers SV1 to SV3 is used is assumed.

In this case, for example, in response to the operation of the police officer within police station 5, station PC 71 can extract target image data based on any attribute information related to the image data, such as the classification of image content, police officer 7 who captures the image data, date and time, and a capturing place, from the stored image data, and can reproduce the extracted data. In this case, the attribute information correlated to the image data is used. The attribute information is attached to the image data, and thus, it is easy to check an image obtained by capturing which target. As a result, it is easy to extract the target image data.

Here, wearable camera 10 attaches classification information indicating the classification of image content as the attribute information, and thus, the image data items can be classified into the respective classifications. The classification information indicates a category capable of identifying the content of the image data in a place or the patrol of a scene where police officer 7 is dispatched. The attribute information is not limited to the classification information, and includes various information items related to the recorded image data. For example, the classification information as the attribute information may have a hierarchical structure, or may be classified into a category according to a plurality of different hierarchies. Similarly, vehicle-mounted recorder 62 attaches the classification information indicating the classification of image content as the attribute information, and thus, the image data items can be classified into the respective classifications.

Figures 10, 11:
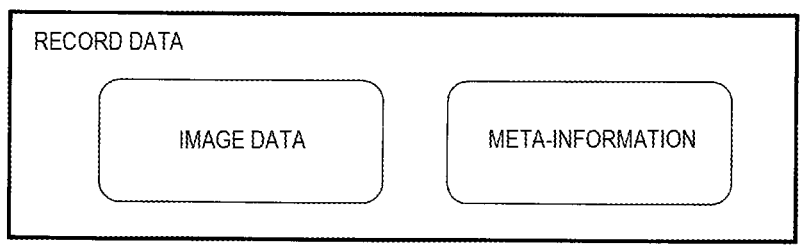
FIG. 10 is a diagram showing an example of the correlation between attribute information and a state of an attribute selection switch.
FIG. 11 is a diagram showing an example of the data structure of record data.

FIG. 10 is a diagram showing an example of the correlation between the attribute information and the state of attribute selection switch SW4. When wearable camera 10 is used, the attribute information is classified and is set so as to correspond to the states (contact points) C1 to C3 of attribute selection switch SW4, as shown in FIG. 10. In the illustrated example, it is assumed that police officer 7 captures scene 8 (for example, the scene of the incident). Driving under the influence is allocated to C1, drug abuse violation is allocated to C2, and stolen property is allocated to C3.

For example, the allocation of the attribute information is set in such a manner MCU 19 of wearable camera 10 selects attribute information having a high frequency of use from the point of view of police officer 7, from a plurality of defined attribute information items. For example, the setting content of the attribute information is stored as one of setting information in EEPROM 16 of wearable camera 10.

Vehicle-mounted recorder 62, for example, communicator 203 acquires the attribute information input by input 205 of vehicle-mounted management PC 63, and CPU 101 attached the acquired attribute information to the image data captured by vehicle-mounted camera 61. In the attachment of the attribute information due to vehicle-mounted recorder 62, since the number of contact points is not decided unlike attribute selection switch SW4, it is possible to attach a larger number of types of attribute information items.

FIG. 11 is a schematic diagram showing an example of the data structure of record data. The record data includes the recorded image data, and meta-information corresponding to the image data. The meta-information will be described below, but the meta-information includes the attribute information. The record data which is captured by wearable camera 10 and is recorded has the same format as that of the recode data which is captured by vehicle-mounted camera 61 and is recorded by vehicle-mounted recorder 62.

Hereinafter, the data structure of a record image list will be described. The record image list related to the image data captured by wearable camera 10 is retained in storage 15 of wearable camera 10. The record image list related to the image data captured by vehicle-mounted camera 61 is retained in SSD 111 of vehicle-mounted recorder 62.

FIG. 12 is a schematic diagram showing an example of the data structure of the record image list retained in wearable camera 10 of the present exemplary embodiment. When the operation input of attribute information attachment switch SW3 is detected during the recording or after the recording, wearable camera 10 generates the attribute information related to the image data of the recording target, and stores the meta-information including the attribute information in storage 15. That is, the image data and the meta-information are included in the record data stored in storage 15 (see FIG. 11). When wearable camera 10 transmits the image data to servers SV1 to SV3, the record data including the image data and the meta-information is transmitted and is accumulated. The image data and the meta-information may be separately transmitted.

For example, the meta-information related to the image data is stored as the record image list shown in FIG. 12. For example, the meta-information of the record image list is information obtained by correlating the image positional information (that is, image time information), the car ID, the officer ID, the attribute information (that is, incident category), a recording start trigger, a recording start instruction transmitting time, and other information items with information (that is, image data ID) for identifying the image data.

The image data and the meta-information are bound by the image data ID. The image data ID is identification information for identifying the recorded image data. For example, the image data ID is attached to the image data at the time of starting the recording, during the recording, or at the time of ending the recording. For example, the image data ID includes a recording start time, a file name, and other IDs of the image data.

The image positional information is time information obtained by attaching the meta-information to the image data, that is, is information of time (referred to as an attribute information attachment time) when the operation input of attribute information attachment switch SW3 is detected. The image positional information may be time information obtained by attaching the meta-information to the image data, or may be time when the recording of the image data captured by wearable camera 10 is started.

The car ID is identification information for identifying individual police car 6. The officer ID is identifying information of police officer 7 who uses wearable camera 10. The car ID and the officer ID are set, and thus, it is possible to determine police officer 7 who records the image data using wearable camera 10 and patrol car 6 which is used by the officer.

The attribute information is classification information (that is, an incident category) for identifying the classification related to the content of the image data, and is attached according to attribute selection switch SW4 based on the setting content of the attribute information shown in FIG. 10.

Figure 15:
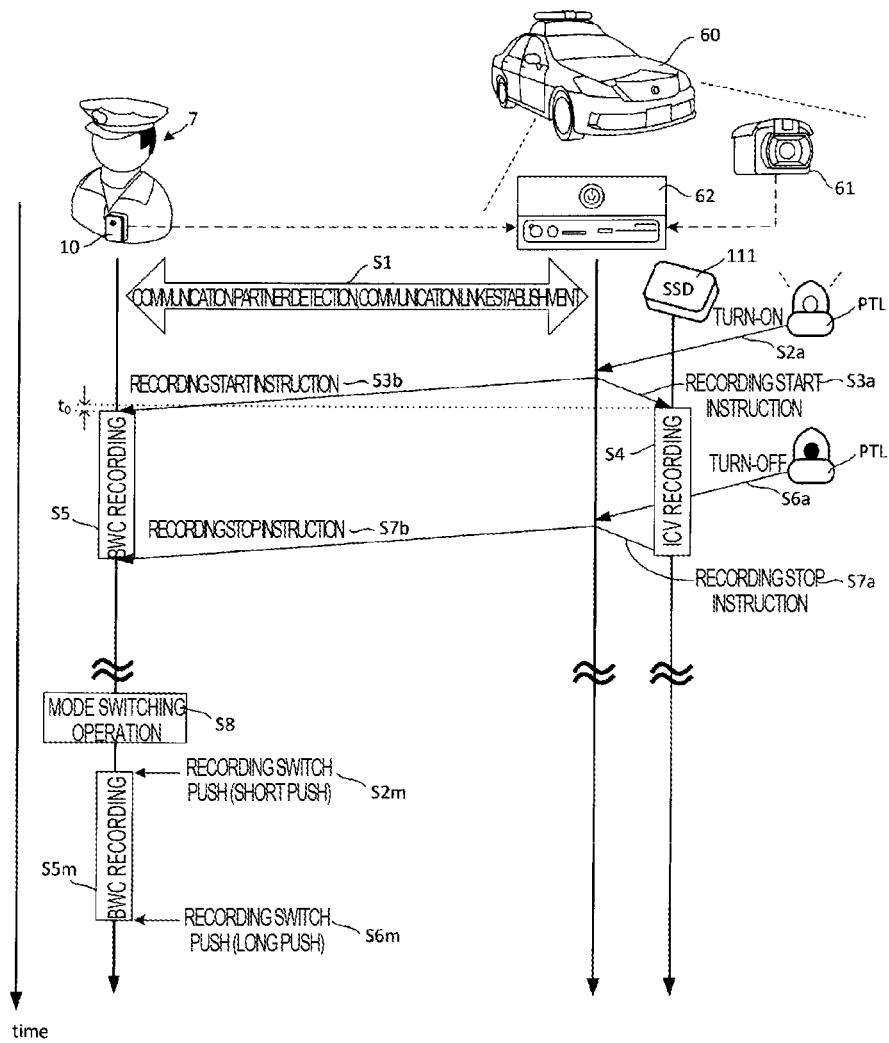
FIG. 15 is a sequence diagram for describing a second example of the procedure of the recording start and recording stop operation in the wearable camera system according to the present exemplary embodiment in detail.

The recording start trigger indicates a factor by which the recording of the image data is started. For example, the recording start factor may be a detection of the push operation of recording switch SW1 or snapshot switch SW2, or may be a detection of the recording start trigger based on output information of GPS 18, RTC 17 or a sensor (for example, an acceleration sensor that is not shown) included in wearable camera 10. As shown in FIGS. 14 and 15, when wearable camera 10 starts the recording of the image data according to the instruction (specifically, the recording start instruction transmitted from vehicle-mounted recorder 62) of vehicle-mounted camera system 60, the recording start trigger may be the instruction of vehicle-mounted camera system 60 (see image data ID1 of FIG. 12).

As shown in FIGS. 14 and 15, when wearable camera 10 starts the recording of the image data according to the instruction of vehicle-mounted camera system 60, the recording start instruction transmitting time indicates a transmission time of the recording start instruction included in the recording start instruction transmitted from vehicle-mounted recorder 62. For example, another information item includes GPS information. The GPS information is positional information indicating a place where the recording of the image data is performed, and is attached by acquiring current positional information from GPS 18 at the time of attaching the attribute information. For example, the meta-information shown in FIG. 12 is attached by the process of MCU 19, and is stored in storage 15 by being associated with the image data captured by wearable camera 10.

Although not shown in FIG. 12, one or more meta-information items (that is, image positional information, car ID, officer ID, attribute information, recording start trigger, recording start instruction transmitting time, and a combination of other information items) may be attached to one image data item, that is, one image data ID. For example, when police officer 7 exposes a drug abuse violation during a crackdown on the driving under the influence, wearable camera 10 can attach two meta-information items to one image data item by performing the input operation of attribute information attachment switch SW3 twice while continuing to record the image data.

FIG. 13 is a schematic diagram showing an example of the data structure of the record image list retained in vehicle-mounted recorder 62 of the present exemplary embodiment. Similarly to the record image list shown in FIG. 12, the record image list retained in vehicle-mounted recorder 62 includes the meta-information including the attribute information for the image data. The content of the meta-information is the same as the content of the meta-information shown in FIG. 12 except that there is no attribute information. However, in response to the operation of police officer 7 with respect to vehicle-mounted management PC 63, vehicle-mounted recorder 62 may attach a larger number of types of attribute information items (for example, incident categories) than the number of attribute information items attached by wearable camera 10, and may store the attached attribute information items in the record image list.

As the information related to the recording start trigger, vehicle-mounted recorder 62 includes the detection of the push operation of the attachment button of the attribute information, and the detection of the recording start trigger based on the information of GPS 107, RTC 17 or a sensor (for example, any one of a speed sensor, an acceleration sensor, and a door opening and closing sensor which are not shown) included in vehicle-mounted camera system 60. As shown in FIGS. 14 and 15, when vehicle-mounted recorder 62 starts the recording of the image data according to the instruction (specifically, the recording start instruction transmitted from vehicle-mounted recorder 62) of vehicle-mounted camera system 60, the recording start trigger may be the instruction of vehicle-mounted camera system 60 (see image data ID1 of FIG. 13).

As shown in FIGS. 14 and 15, when vehicle-mounted recorder 62 starts the recording of the image data according to the instruction of vehicle-mounted camera system 60, the recording start instruction transmitting time is a transmission time of the recording start instruction included in the recording start instruction transmitted from vehicle-mounted recorder 62 in order for vehicle-mounted recorder 62 to instruct wearable camera 10 to start the recording. For example, the above-described meta-information attached by the vehicle-mounted recorder 62 is attached by the process of CPU 101, and is stored in SSD 111 so as to be associated with the image data captured by vehicle-mounted camera 61.

Hereinafter, an operation example of wearable camera system 100 will be described.

FIG. 14 is a sequence diagram for describing a first example of a procedure of the recording start and recording stop operation in a wearable camera system according to the present exemplary embodiment in detail. In FIG. 14, an example in which vehicle-mounted recorder 62 and wearable camera 10 are wireless connected by the wireless LAN is described. However, the vehicle-mounted recorder and the wearable camera may be wirelessly connected by another method, or may be connected in a wired manner. As an assumption of the description of FIG. 14, it is assumed that wearable camera 10 is in a mode in which the recording of the image data is not immediately started even when police officer 7 performs the short-push operation of recording switch SW1 or a mode in which the recording of the image data is not immediately stopped even when police officer 7 performs the long-push operation of recording switch SW1.

In FIG. 14, vehicle-mounted recorder 62 and wearable camera 10 mutually detect a communication partner (that is, wearable camera 10 from the point of view of vehicle-mounted recorder 62, and vehicle-mounted recorder 62 from the point of view of wearable camera 10), and a communication link between vehicle-mounted recorder 62 and wearable camera 10 is established (S1). Specifically, vehicle-mounted recorder 62 and wearable camera 10 detect the communication partner by performing a pairing process by using the password and SSID of the wireless LAN.

For example, vehicle-mounted recorder 62 and wearable camera 10 mutually exchange the retained car ID and officer ID, and establish the communication link when the car IDs and officer IDs retained in the host device and the device serving as the communication partner match with each other. Vehicle-mounted recorder 62 and wearable camera 10 may establish the communication link by detecting the communication partner without checking the matching of the camera IDs and officer IDs. For example, when police officer 7 does not log on to vehicle-mounted management PC 63, since the camera ID and the officer ID are not input in vehicle-mounted recorder 62, the camera ID and the officer ID are not retained in vehicle-mounted recorder 62.

In this case, it is also possible to establish the communication link between vehicle-mounted camera system 60 and wearable camera 10. For example, a combination of police officer 7 and the police car when the officer is dispatched is different for each time, and thus, vehicle-mounted recorder 62 and wearable camera 10 can be simply connected using the wireless LAN or the like even when the combination thereof is not decided.

After step S1, when officer 7 performs the short-push operation of recording switch SW1, wearable camera 10 generates a recording start request in response to the detection of the short-push operation of recording switch SW1, and transmits the recording start request to vehicle-mounted recorder 62 (S2). When the recording start request is received, vehicle-mounted recorder 62 instructs CPU 101 to start the recording of the image data captured by vehicle-mounted camera 61 in SSD 111 (S3a), and continues to store the image data in SSD 111 (S4).

Simultaneously when the instruction to record the image data in SSD 111 is transmitted, vehicle-mounted recorder 62 generates an instruction (that is, a recording start instruction) to start the recording of the image data captured by wearable camera 10, and transmits the generated instruction to wearable camera 10 (S3b). In vehicle-mounted camera system (ICV: In Car Video System) 60, there is a time difference t0 between the recording start time of the image data in vehicle-mounted recorder 62 and the recording start time of the image data in wearable camera 10 depending on a distance between vehicle-mounted recorder 62 (that is, police car 6) and wearable camera 10 (that is, police officer 7), but the time difference is a value regarded as a value which is extremely close to zero or an error range. Accordingly, in the present exemplary embodiment, a time when the recording of the image data captured by vehicle-mounted camera 61 is started in vehicle-mounted recorder 62 (SSD 111) and a time when the recording of the image data captured by wearable camera 10 is started in wearable camera 10 are substantially the same time.

In order to indicate that the recording start instruction is transmitted to wearable camera 10 simultaneously with the timing when the instruction to start the recording of the image data captured by vehicle-mounted camera 61 in SSD 111 is transmitted, vehicle-mounted recorder 62 may turn on LED 110 in predetermined color.

When the recording start instruction is received from vehicle-mounted recorder 62, wearable camera 10 starts the recording of the image data captured by capture 11, and continues the storing of the image data in storage 15 (S5). As stated above, in the present exemplary embodiment, vehicle-mounted recorder 62 transmits the recording start instruction to wearable camera 10 such that the wearable camera 10 can start the recording almost simultaneously with the timing when vehicle-mounted recorder 62 starts the recording. Accordingly, in the wearable camera system of the present exemplary embodiment, the recording of image data of a scene which is captured by vehicle-mounted camera 61 provided in police car 6 and is included in an angle of view having a fixed angle and the recording of image data of a scene which is captured by wearable camera 10 worn by police officer 7 and is included in an angle of view having a variable angle can be almost simultaneously performed, and thus, it is possible to record the image data of the situation of the scene in a wide area in the same time.

When police officer 7 performs the long-push operation of recording switch SW1, wearable camera 10 generates a recording stop request in response to the detection of the long-push operation of recording switch SW1, and transmits the recording stop request to vehicle-mounted recorder 62 (S6). When the recording stop request is received, vehicle-mounted recorder 62 stops the recording of the image data captured by vehicle-mounted camera 61 in SSD 111 (S7a), and stops the storing of the image data in SSD 111.

Vehicle-mounted recorder 62 generates an instruction (that is, a recording stop instruction) to stop the recording of the image data captured by wearable camera 10 and transmits the generated instruction to wearable camera 10 simultaneously when the instruction to stop the recording of the image data in SSD 111 is transmitted (S7b). In vehicle-mounted camera system 60, there is a time difference t0 (not shown in FIG. 14) between a time when the recording of the image data in vehicle-mounted recorder 62 is stopped and a time when the recording of the image data in wearable camera 10 is stopped depending on the distance between vehicle-mounted recorder 62 (that is, police car 6) and wearable camera 10 (that is, police officer 7), but the time difference is a value regarded as a value which is extremely close to zero or an error range. Accordingly, in the present exemplary embodiment, a time when the recording of the image data captured by vehicle-mounted camera 61 is stopped in vehicle-mounted recorder 62 and a time when the recording of the image data captured by wearable camera 10 is stopped in wearable camera 10 are the almost substantially time.

In order to indicate that the recording stop instruction is transmitted to wearable camera 10 simultaneously with the timing when the recording of the image data captured by vehicle-mounted camera 61 is stopped, vehicle-mounted recorder 62 may turn on LED 110 in predetermined different colors, or may turn off LED 110.

When the recording stop instruction is received from vehicle-mounted recorder 62, wearable camera 10 stops the recording of the image data captured by capture 11, and stops the storing of the image data in storage 15. As mentioned above, in the present exemplary embodiment, vehicle-mounted recorder 62 transmits the recording stop instruction to wearable camera 10 such that the recording of wearable camera 10 can be stopped almost simultaneously with the recording stop instruction in SSD 111. Accordingly, in the wearable camera system of the present exemplary embodiment, the recording of image data of a scene which is captured by vehicle-mounted camera 61 provided in police car 6 and is included in an angle of view having a fixed angle can be stopped simultaneously with the timing when the recording of image data of a scene which is captured by wearable camera 10 worn by police officer 7 and is included in an angle of view having a variable angle is stopped, and thus, it is possible to record image data items of the situation of the scene in a wide area in which start times and end times of a plurality of image data items having different angles are the same.

It is assumed that a mode in which the recording of the image data is started immediately when police officer 7 performs the shot-push operation of recording switch SW1 and a mode in which the recording of the image data is stopped immediately when police officer 7 performs the long-push operation of recording switch SW1 are switched by the operation of police officer 7 on wearable camera 10 (S8).

After the mode is switched, when police officer 7 performs the short-push operation of recording switch SW1 of wearable camera 10 (S2*m*), wearable camera 10 captures the image of the situation of the scene where police officer 7 exists, and starts the recording of the image data (S5*m*). When police officer 7 performs the long-push operation of recording switch SW1 of wearable camera 10 (S6*m*), wearable camera 10 stops the recording of the image of the situation of the scene where police officer 7 exists.

The present exemplary embodiment is not limited to the example in which the recording start request is the short-push operation of recording switch SW1 of wearable camera 10 in step S2 and the recording stop request is the long-push operation of recording switch SW1 of wearable camera 10 in step S6 (see FIG. 15). FIG. 15 is a sequence diagram for describing a second example of the procedure of the recording start and recording stop operation in a wearable camera system according to the present exemplary embodiment in detail. In the description of FIG. 15, the same steps to those in the description of FIG. 14 will be assigned the same step numbers, and the redundant description thereof will be omitted. Different content will be described.

The recording start request in FIG. 14 is generated by wearable camera 10 through the short-push operation of recording switch SW1 by police officer 7. In FIG. 15, the recording start request is a timing when PATLITE (registered trademark) PTL attached to police car 6 is turned on according to the instruction of vehicle-mounted management PC 63 by police officer 7 (S2*a*). The timing when PATLITE (registered trademark) PTL is turned on is not limited to the instruction of vehicle-mounted management PC 63 by police officer 7, and may be a timing when the driving of police car 6 is started, or a timing when a traveling speed of police car 6 is less than a prescribed speed.

The recording stop request in FIG. 14 is generated by wearable camera 10 through the long-push operation of recording switch SW1 by police officer 7. In FIG. 15, the recording stop request is a timing when PATLITE (registered trademark) PTL attached to police car 6 is turned off according to the instruction of vehicle-mounted management PC 63 by police officer 7 (S6*a*). The timing when PATLITE (registered trademark) PTL is turned off is not limited to the instruction of vehicle-mounted management PC 63 by police officer 7, and may be a timing when the driving of police car 6 is ended, or a timing when a traveling speed of police car 6 is equal to a prescribed speed.

Accordingly, for example, even when police officer 7 forgets the recording start operation of recording switch SW1 or snapshot switch SW2 of wearable camera 10 in order to take the immediate action, it is possible to record the image data of scene 8 by the turn-on of PATLITE (registered trademark) PTL.

There is a possibility that the recording will not be performed without a time enough for police officer 7 to perform the recording start operation, and a state (that is, recording omission) in which an important scene for inspecting the scene of the incident later is not recorded may occur. Police officer 7 is preoccupied with the recording start operation, and thus, there is a possibility that attentiveness of police officer 7 at the time of immediate action will be degraded. Even when the vehicle-mounted camera is mounted on a vehicle such as a police car used when the officer is dispatched and the recording can be performed by the vehicle-mounted camera, it is difficult to perform the recording start operation similarly to the immediate action, and the recording omission may occur.

Accordingly, for example, even when police officer 7 forgets the recording stop operation of recording switch SW1 of wearable camera 10 in order to take the immediate action, wearable camera 10 and vehicle-mounted recorder 62 can record the image data of the scene and stop the recording thereof in the same timing by starting or stopping the recording in wearable camera 10 or vehicle-mounted recorder 62 in cooperation with the turn-on or turn-off of PATLITE (registered trademark) PTL.

Figure 16:
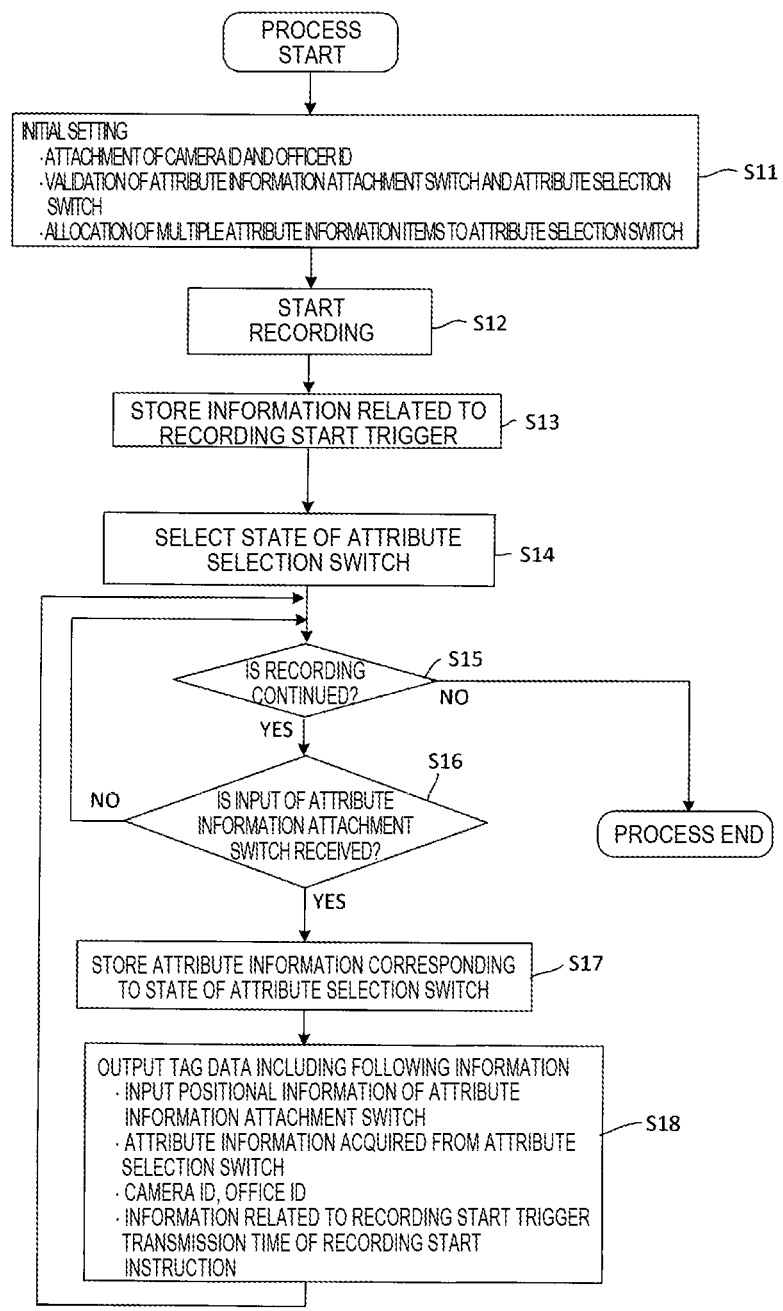
FIG. 16 is a flow chart for describing an example of a procedure of an attachment operation of attribute information in a wearable camera of the present exemplary embodiment in detail.

FIG. 16 is a flowchart for describing an example of a procedure of the attachment operation of the attribute information in wearable camera 10 of the present exemplary embodiment in detail.

MCU 19 of wearable camera 10 performs an initial setting before the attachment of the attribute information (S11). For example, the initial setting of wearable camera 10 is performed by connecting the wearable camera to station PC 71 within police station 5, operating station PC 71 and transmitting the setting information when police officer 7 is dispatched.

For example, the initial setting includes the attachment of the camera ID and the officer ID, the validation of attribute information attachment switch SW3 and attribute selection switch SW4, and the allocation (for example, see FIG. 10) of the plurality of attribute information items to attribute selection switch SW4.

When the recording start instruction transmitted from vehicle-mounted recorder 62 is acquired, MCU 19 starts the recording operation of the image data captured by capture 11, and stores the image data in storage 15 (S12). The image data herein may be a moving image or a still image.

For example, when the recording operation is started according to the recording start instruction transmitted from vehicle-mounted recorder 62, MCU 19 stores various information items (see FIG. 12, except for attribute information to be described below) including the recording start trigger and the recording start instruction transmitting time in RAM 13, as the meta-information (S13).

After the recording of the image data is started, MCU 19 inputs a selection state of attribute selection switch SW4 (S14).

MCU 19 determines whether or not the recording is continued (S15). For example, when the recording stop instruction transmitted from vehicle-mounted recorder 62 is not received by communicator 21, the recording is continued. When the recording is not continued, MCU 19 ends the attribute information attachment operation.

Meanwhile, when the recording is continued, MCU 19 determines whether or not attribute information attachment switch SW3 is input (S16). That is, the attachment of the attribute information is performed in response to the operation of officer 7 during the recording of the image data or after the recording. The selection state of attribute selection switch SW may be changed during the recording of the image data once. That is, a plurality of attribute information items may be selected and attached to one image data item.

When the input from attribute information attachment switch SW3 is operated, MCU 19 reads the attribute information corresponding to the state of attribute selection switch SW4 from EEPROM 16, and attaches the attribute information to the image data (S17). When the input from attribute information attachment switch SW3 is not operated, the process proceeds to S13.

MCU 19 associates the metainformation including the attached attribute information with the image data that is being recorded or immediately-before recorded image data, and stores the image data in storage 15 (S18). For example, the meta-information herein includes image positional information, the camera ID, the officer ID, the attribute information (for example, incident category), a recording start trigger, and a recording start instruction transmitting time as shown in the record image list of FIG. 12. When the recording is stopped in step S15, MCU 19 may add information of a recording stop instruction transmitting time transmitted from vehicle-mounted recorder 62 to the meta-information, and may store the information.

For example, the image positional information is acquired as a current time from RTC 17 when the input of attribute information attachment switch SW3 is operated. For example, the camera ID and the officer ID are acquired from EEPROM 16. For example, the information related to the recording start trigger is acquired from RAM 13 which is stored in S13. Since the recording start instruction transmitting time is included in the recording start instruction, the recording start instruction transmitting time is acquired from RAM 13. After the process of S18, the process proceeds to S15.

In wearable camera 10, MCU 19 may turn on at least a part of LED 26*a* to 26*c* in response to the stored recording start trigger. For example, in response to the recording start trigger, the turn-on time may be changed, a blinking method may be changed, or a color when the LED is turned on may be changed.

Accordingly, police officer 7 who possesses wearable camera 10 checks LEDs 26*a* to 26*d*, and thus, it is possible to easily recognize the fact that the recording is started without performing an independent operation and recording start trigger.

As stated above, according to the attribute information attachment operation of wearable camera 10, it is possible to easily attach the attribute information immediately after the recording is performed or during the recoding, and thus, it is possible to store the meta-information to the recorded image data. Accordingly, for example, it is not necessary for police officer 7 to edit the meta-information by attaching the attribute information by using station PC 71 within police station 5 from after the officer is separated from scene 8 captured by wearable camera 10. That is, since it is not necessary for police officer 7 to determine the classification while reproducing the image data and to perform the input operation of the attribute information or meta-information, it is possible to reduce time and labor for inputting the attribute information and the meta-information. It is possible to prevent image data to which the attribute information or the meta-information is not input from being collected, and it is possible to save labor required to check individual image data. As a result, it is possible to reduce an effort to determine the classification of the image data and to input the attribute information and the meta-information.

For example, wearable camera 10 retains the information of the recording start trigger included in the meta-information, wearable camera 10 can check that the recording is started in cooperation with vehicle-mounted camera system 60 by station PC 71, vehicle-mounted management PC 63 or a mobile terminal (not shown) after the recording.

Various exemplary embodiments have been described with reference to the drawings, but the present invention is not limited to the exemplary embodiments. It is apparent to those skilled in the art that various modification examples or change examples can be derived within the scope described in the claims, and it should be understood that these modification examples or change examples are included in the technical scope of the present invention. The respective components in the above-described exemplary embodiments may be arbitrarily combined without departing from the gist of the present invention.

For example, the recording start request includes a detection of the push operation of button 109, a detection that the traveling speed of police car 6 due to the speed sensor is equal to or greater than a predetermined speed (for example, 100 km/h), a detection of collision due to the acceleration sensor (that is, the detection that the acceleration is changed to a predetermined threshold or more), and a detection that the communication is out of a communication range capable of communicating with wearable camera 10 through wireless communicator 102.

What is claimed is:
1. A wearable camera system comprising:
a wearable camera capable of being worn by a user; and
a vehicle-mounted recorder and a vehicle-mounted camera which are mounted on a vehicle in which the user rides, the vehicle-mounted recorder and the vehicle-mounted camera communicably connected to each other,
wherein the wearable camera includes:
a first communicator that communicates with the vehicle-mounted recorder,
a first imaging unit that captures an image of a capturing area,
a first recorder that records first image data of the capturing area captured by the first imaging unit in a first memory,
a data storage, and
a recording switch, operation of which causing the wearable camera to transmit a recording start request to the vehicle-mounted recorder;
wherein the vehicle-mounted recorder includes:
a second communicator that communicates with the wearable camera, and
a second recorder that records second image data of the capturing area captured by the vehicle-mounted camera in a second memory,
wherein the vehicle-mounted recorder instructs the second recorder to start the recording of the second image data when the recording start request is received, and the vehicle-mounted recorder generates a recording start instruction to start the recording of the first image data captured by the first imaging unit of the wearable camera and transmits the recording start instruction to the wearable camera simultaneously with instructing the second recorder to start recording of the second image data, wherein the wearable camera starts recording of the first image data upon receiving the recording start instruction generated and transmitted by the vehicle-mounted recorder, and wherein a recording start trigger correlated with the first image data recorded by the first recorder of the wearable camera is stored in the data storage of the wearable camera, the recording start trigger being an instruction from the vehicle mounted recorder or operation of the recording switch, the recording start trigger correlated with the first image data capable of indicating to a user of the first image data recorded by the first recorder of the wearable camera, a factor which caused the first recorder of the wearable camera to start recording of the first image data.

2. The wearable camera system according to claim 1, wherein the vehicle-mounted recorder instructs the second recorder to stop the recording of the second image data when a recording stop request is received, and transmits a recording stop instruction to the wearable camera simultaneously with instructing the second recorder to stop recording the second image data, and wherein the wearable camera stops recording of the first image data after receiving the recording stop instruction.

3. The wearable camera system according to claim 1, wherein the recording start instruction includes a transmission time of the recording start instruction from the vehicle-mounted recorder to the wearable camera.

4. The wearable camera system according to claim 3, wherein the wearable camera further includes an operator, which in operation receives an attachment operation of attribute information related to the first image data, and a first controller that causes identification information of the first image data, the attribute information and a transmission time of the recording start instruction corresponding to the recording of the first image data to be stored in the first memory by correlating the identification information, the attribute information and the transmission time with each other when the attachment operation is received, and wherein the vehicle-mounted recorder further includes a second controller that causes identification information of the second image data and a same time as a transmission time of the recording start instruction corresponding to the recording of the second image data to be stored in the second memory by correlating the identification information and the same time.

5. The wearable camera system according to claim 1, further comprising: a notification lamp mounted on the vehicle that gives notification of an emergency state, and wherein the vehicle-mounted recorder acquires the recording start request in response to turning on the notification lamp.

6. A recording control method in a wearable camera system that includes a wearable camera capable of being worn by a user, a vehicle-mounted recorder and a vehicle-mounted camera which are mounted on a vehicle in which the user rides and are communicably connected to each other, the method comprising:

performing communication between the wearable camera and the vehicle-mounted recorder;

capturing an image of a capturing area by the wearable camera;

capturing an image of the capturing area by the vehicle-mounted camera;

operating a recording switch of the wearable camera;

in response to operating the recording switch of the wearable camera, causing the wearable camera to transmit a recording start request to the vehicle-mounted recorder;

instructing that recording of second image data of the capturing area captured by the vehicle-mounted camera be started in response to receipt by the vehicle-mounted recorder of the recording start request from the wearable camera;

transmitting a recording start instruction to start recording of first image data of the capturing area captured by the wearable camera, from the vehicle-mounted recorder to the wearable camera, simultaneously with instructing the vehicle-mounted recorder to begin recording the second image data of the capturing area captured by the vehicle-mounted camera;

starting recording of the second image data in the vehicle-mounted recorder in response to receipt of the recording start request;

starting recording of the first image data of the capturing area captured by the wearable camera in the wearable camera upon receipt of the recording start instruction by the wearable camera; and storing in the wearable camera a recording start trigger correlated with the first image data of the capturing area captured by the wearable camera, the recording start trigger being an instruction from the vehicle mounted recorder or operation of the recording switch, the recording start trigger correlated with the first image data capable of indicating to a user of the first image data captured by the wearable camera a factor which caused the wearable camera to start recording of the first image data.

7. The recording control method in a wearable camera system according to claim 6, further comprising:

instructing the vehicle-mounted recorder to stop the recording of the second image data when a recording stop request is received; and transmitting a recording stop instruction to the wearable camera simultaneously with instructing the vehicle-mounted recorder to stop recording the second image data, wherein the wearable camera stops recording of the first image data after receiving the recording stop instruction.

8. The recording control method in a wearable camera system according to claim 6, wherein the recording start instruction includes a transmission time of the recording start instruction from the vehicle-mounted recorder to the wearable camera.

9. The recording control method in a wearable camera system according to claim 8, further comprising:

receiving by an operator of the wearable camera an attachment operation of attribute information related to the first image data;

storing in the first memory identification information of the first image data, the attribute information and a transmission time of the recording start instruction corresponding to the recording of the first image data to be stored in the first memory by correlating the identification information, the attribute information and the transmission time with each other when the attachment operation is received; and storing in the second memory identification information of the second image data and a same time as a transmission time of the recording start instruction corresponding to the recording of the second image data to be stored in the second memory by correlating the identification information and the same time.

10. The recording control method in a wearable camera system according to claim 6, further comprising:
providing a notification of an emergency state via a notification lamp mounted on the vehicle, wherein the vehicle-mounted recorder acquires the recording start request in response to turning on the notification lamp.

11. The wearable camera system of claim 1, wherein the recording start trigger includes information indicating that the second recorder started video recording of an incident attended by the user of the wearable camera.

12. The wearable camera system of claim 11, wherein the user of the wearable camera is a police officer or a security guard.

13. The recording control method of claim 6, wherein the recording start trigger includes information indicating that the second recorder started video recording of an incident attended by the user of the wearable camera.

14. The recording control method of claim 13, wherein the user of the wearable camera is a police officer or a security guard.

* * * * *